(12) United States Patent
Kiefl et al.

(10) Patent No.: US 12,262,725 B2
(45) Date of Patent: Apr. 1, 2025

(54) IMPROVING TASTE PROFILE OF ORANGE JUICE

(71) Applicant: SYMRISE AG, Holzminden (DE)

(72) Inventors: Johannes Kiefl, Holzminden (DE); Susanne Paetz, Höxter (DE); Jakob Ley, Holzminden (DE); Michael Backes, Holzminden (DE); Joachim Hans, Holzminden (DE)

(73) Assignee: SYMRISE AG, Holzminden (DE)

(*) Notice: Subject to any disclaimer, the term of this patent is extended or adjusted under 35 U.S.C. 154(b) by 845 days.

(21) Appl. No.: 15/771,944

(22) PCT Filed: Nov. 14, 2015

(86) PCT No.: PCT/EP2015/076633
§ 371 (c)(1),
(2) Date: Apr. 27, 2018

(87) PCT Pub. No.: WO2017/071784
PCT Pub. Date: May 4, 2017

(65) Prior Publication Data
US 2018/0360086 A1  Dec. 20, 2018

(30) Foreign Application Priority Data
Oct. 29, 2015 (WO) ............... PCT/EP2015/075187

(51) Int. Cl.
*A23L 27/20* (2016.01)
*A23L 27/00* (2016.01)

(52) U.S. Cl.
CPC ......... *A23L 27/2052* (2016.08); *A23L 27/204* (2016.08); *A23L 27/84* (2016.08); *A23L 27/86* (2016.08); *A23V 2002/00* (2013.01); *A23V 2200/16* (2013.01); *A23V 2250/21162* (2013.01)

(58) Field of Classification Search
CPC ...... A23V 2250/21162; A23V 2002/00; A23V 2200/16; A23L 27/2052; A23L 27/86; A23L 27/204; A23L 27/84
USPC .......................................................... 426/536
See application file for complete search history.

(56) References Cited

U.S. PATENT DOCUMENTS

| | | | | | |
|---|---|---|---|---|---|
| 1,358,960 | A | * | 11/1920 | Lorenzen | A23L 7/143 426/627 |
| 2,791,508 | A | * | 5/1957 | Rivoche | A23L 19/19 426/550 |
| 2006/0105089 | A1 | * | 5/2006 | Chu | A23L 2/06 426/599 |
| 2013/0078192 | A1 | * | 3/2013 | Backes | A61K 8/498 424/49 |
| 2014/0348992 | A1 | * | 11/2014 | Shea | A23B 7/159 426/271 |

FOREIGN PATENT DOCUMENTS

| EP | 1258200 A2 | 11/2002 |
|---|---|---|
| EP | 2725026 A1 | 4/2014 |
| EP | 2570035 B1 | 6/2014 |
| EP | 2570036 A1 | 6/2014 |

OTHER PUBLICATIONS

NPL Kreygor et al. (in Book ISBN 9780841220263, Book chapter 11; by Frey and Rouseff entitled Natural Flavors and Fragrances ACS Symposium Series, Washington DC, 2005). (Year: 2005).*
NPL Search (#3 is the NPL Reference NPL Kreygor et al. as detailed above). (Year: 2005).*
NPL Albertini et al. (in J Agric. Food Chem. 54: 8335-8339, 2006). (Year: 2006).*
Prior art web search printable record (Google Scholar Search) has above reference (Year: 2006).*
International Search Report and Written Opinion issued on Jun. 24, 2016 in the PCT Application No. PCT/EP2015/076633.

* cited by examiner

*Primary Examiner* — Bhaskar Mukhopadhyay
(74) *Attorney, Agent, or Firm* — POLSINELLI PC

(57) ABSTRACT

The present invention describes a food product comprising
(a) juice, marrow, flesh or peels or other components of at least one citrus fruit,
(b) at least one neoflavonoid as well as optionally
(c) further flavoring agents or flavor preparations, providing that the component (b) is present in a sufficient amount to improve the sour and/or bitter taste of the component (a).

8 Claims, No Drawings

IMPROVING TASTE PROFILE OF ORANGE JUICE

CROSS-REFERENCE TO RELATED APPLICATIONS

This application is a national stage application (under 35 U.S.C. § 371) of PCT/EP2015/076633, filed Nov. 14, 2015, which claims benefit of European Application No. PCT/EP2015/075187, filed Oct. 29, 2015, which are incorporated herein by reference in their entireties.

FIELD OF THE INVENTION

The invention is on the field of food products and relates to food products containing citrus and particularly orange products with added neoflavonoids with the aim of the reduction of the unpleasant, particularly the sour and bitter, taste of these food products.

STATE OF THE ART

Food products, particularly drinks, which are mainly produced from fruits of various citrus species, play a prominent role in the international food product market. Here, especially orange juice (Citrus x sinensis L. or Citrus x aurantium) in the form of direct juice or reconstituted juice from concentrate and food products based on orange juice such as nectars or fruit juice drinks are to be mentioned. In addition to the typical citrus/orange aroma, especially a balanced sweetness in combination with a sour taste impression and also a certain bitterness are crucial for the sensory quality of such drinks.

Within the last years, the infection of the fruit-bearing trees in the plantations with Huanglongbing-bacterium (e.g. Liberobacter ssp., so-called "Greening disease") which is spread by Psylloidea increases, which results in insufficiently developed and misery matured fruits. The juice obtained thereof usually is less sweet and substantially more sour than the juice obtained from healthy fruit material. Additionally, a substantially stronger bitterness is observed, which is far above the tolerated or required part. Up to a certain proportion, the infected but per se edible fruits may be tolerated in the juices or juice products, in case the proportion becomes too high, particularly the sour taste and the bitterness is clearly observable by the consumer and results in complaints.

It is known from EP 2494874 B1, that a few ingredients of citrus fruits exceeding an individual limit concentration are responsible for the bitter and sour taste, however, no precise teaching is given, how these substances can be reduced to obtain products with proper taste. As far as methods are known from the state of the art, with which such a reduction may be carried out, a loss of further ingredients or a shift in the aroma profile would occur, which is not tolerated. The easiest method is the addition of cane sugar or fructose, which is however in many applications not allowed for regulatory reasons.

Proposals to deplete the responsible fruit acids and bitter compounds, especially citric acid, limonin, glycosylated flavanones or polymethoxylated flavonoids, have been generally made (see EP 2494874 A1), but this leads in most of the cases to other losses of ingredients or shifts of the aroma profile, which are not tolerated. The easiest process is the addition of cane or fruit sugar, but this is not allowed in many applications for regulatory reasons.

From the EP 2570035 B1 (SYMRISE) it is additionally known, that certain neoflavonoids are generally suitable for reducing the bitter taste of certain bitter flavoring substances. Also, the increase of the sweet taste by certain neoflavonoids has been described in EP 2570036 B1 (SYMRISE). But there is no hint to be found, that these substances might also be suitable for reducing the sour taste, especially in sour and bitter orally consumable citrus products.

Thus, it was the object of the present invention, to find flavoring agents or mixtures of flavoring agents, which are already in low concentration capable of reducing or erasing the unpleasant, particularly the sour and the bitter taste of sour and bitter tasting food products and thus of citrus products in general and of orange products specifically, and preferably also to enhance the sweet taste. Additionally, the flavoring substances should be naturally occurring and preferably be able to be obtained by ingredients of the genus Citrus.

DESCRIPTION OF THE INVENTION

A first aspect of the invention relates to food products, comprising
(a) juice, marrow, flesh or peels or other components of at least one citrus fruit,
(b) at least one neoflavonoid of the formula (I)

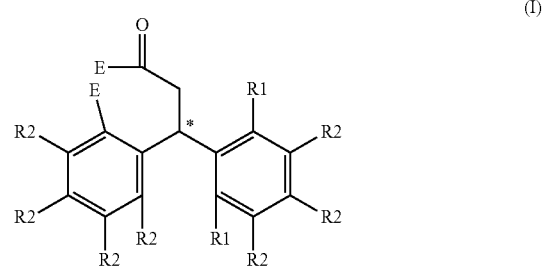

(I)

or of a physiologically acceptable salt of at least one of compounds of the formula (I),
or of a mixture of one, two or several different compounds of the formula (I) with one, two or several different physiologically acceptable salts of one, two or several different compounds of the formula (I),
wherein
E mean either each OH or both E combined one O,
R1 means independent of the respective other rest R1 hydrogen or OR$^a$, wherein R$^a$ is hydrogen, C1-C5-alkyl or C2-C5-alkenyl,
R2 means independent of the other rests R2 hydrogen or OR$^b$, wherein R$^b$ is hydrogen, C1-C5-alkyl or C2-C5-alkenyl,
wherein optionally two directly adjacent rests R1 and/or R2 represent together one OCH$_2$O group.
as well as optionally
(c) further flavoring agents or flavor preparations,
providing that component (b) is present in a sufficient amount to improve the sour and/or bitter taste of component (a).

It was surprisingly found, that the addition of at least 1 ppm neoflavonoids (with regard to the foodstuff), e.g. the 1:1 mixtures of compound 1 and 2 or rather 3 and 4 or rather 5 and 6, or rather 7 and 8, to sour and bitter citrus fruits, especially from orange juice produced from HLB-infected fruits or food products prepared therefrom, reduces the perception of the acid and simultaneously noticeably reduces the bitterness and in parallel causes a clear increase of the sweetness. In particular, it is surprising, that the perception of the acid, despite unchanged pH-value, is perceived greatly reduced.

Food Products

The food products of the present invention are preferably drinks or desserts.

Examples for drinks containing citrus comprise the group consisting of freshly pressed, direct juices, reconstituted juices from juice concentrate, nectars, juice spritzers, refreshing drinks containing juice, milk products containing juice, carbonized drinks containing juice as well as iced tea containing juice.

Examples for desserts containing citrus are found in the group consisting of yoghurts, frozen ice products, sorbets, ice cream, creams, puddings, fillings for chocolate or cookie products, jams as well as dried juice or fruit preparations.

Citrus Products

In the sense of the present invention, the term citrus products is to be understood as the juice, the marrow, the flesh, the peels as well as all further components of citrus fruits; in the following it is used as a synonym for the group (a). Oranges, grapefruits, lemons, limes, mandarins and their mixtures belong to the citrus fruits, the bitter and/or sour taste of which is to be improved.

Group (a) particularly comprises sour and bitter orange products: orange varieties (Citrus x sinensis L. or Citrus x aurantium, Var. Hamlin, Valencia) derived from the genus Citrus, products derived from particularly a proportion of premature or misery matured oranges of HLB infected trees such as juices, juice concentrates, juice fractions with or without albedo part, with or without pulp.

Preferably, minimum concentrations of specific bitter substances apply for the citrus products, particularly
at least 0.1 ppm and particularly about 3 to 5 ppm limonin,
at least 5 ppm and particularly 8 to 15 ppm polymethoxylated flavanones, as well as
at least 200 ppm and particularly 300 to 600 ppm hesperidin,
wherein the specifications each relate to compound (a).

Furthermore, the citrus products forming group (a) should have a pH value in the range of 3 to 6.

Neoflavonoids

The primary task of the present invention is, as specified, solved by the use of one, two or several different compounds of the formula (I)

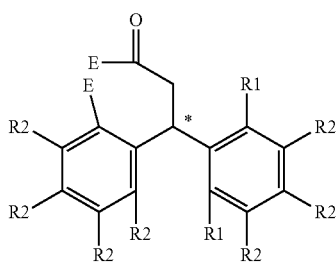

(I)

or of one, two or several different physiologically acceptable salts of one, two or several different compounds of the formula (I),
or of a mixture of one, two or several different compounds of the formula (I) with one, two or several different physiologically acceptable salts of one, two or several different compounds of the formula (I),
wherein
E mean either each OH or both E combined one O,
R1 means independent of the respective other rest R1 hydrogen or $OR^a$, wherein $R^a$ is hydrogen, C1-C5-alkyl or C2-C5-alkenyl,
R2 means independent of the other rests R2 hydrogen or $OR^b$, wherein $R^b$ is hydrogen, C1-C5-alkyl or C2-C5-alkenyl,
wherein optionally two directly adjacent rests R1 and/or R2 represent together one $OCH_2O$ group.

The configuration at the chiral carbon atom of the compound of the formula (I) (i.e. at the position marked by "*" in the above formula image (I)) can be (R) or (S) therein. This also holds for the following statements and structural formulae of the compounds to be applied in the sense of the invention displayed in the following.

The compounds of the formula (I) can thereby be combined as pure enantiomers or as mixtures of enantiomers in preferred embodiments in any arbitrary ratio with to one another with one another. In one preferred embodiment, the compounds of the formula (I) are applied in form of racemic mixtures, i.e. as racemates.

Preferentially, R1 and R2 mean independent of the respective other rest R1 and R2 hydrogen, hydroxy or a rest selected from the group consisting of

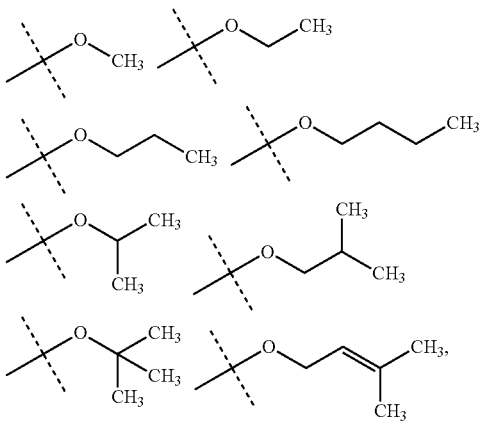

wherein the dashed line marks the bond, which connects the rest with the adjacent C-atom in the formula (I).

Preferentially, for the compounds of the formula (I) holds: R1 means H or OH, and/or one or several of the rests R1 and R2 in formula (I) mean a hydroxy group.

Preferred in the sense of the invention is the above mentioned use, wherein one, two, several all of the applied compounds are selected from the group consisting of the compounds of the formula (I) and their physiologically acceptable salts each, wherein E mean each OH or both E combined one oxygen, R1 means independent of the respective other rest R1 hydrogen or hydroxy, R2 means independent of the other rests R2 hydrogen, hydroxy, methoxy, ethoxy, n-propoxy, iso-propoxy, n-butoxy, iso-butoxy, tert-butoxy or $OR^b$, wherein $R^b$ is C5-alkenyl, thereupon $R^b$ again preferentially means prenyl, wherein optionally two directly adjacent rests R2 together represent one $OCH_2O$ group, wherein preferentially one or several of the rests R1 or R2 mean a hydroxy group.

Preferentially, a compound of the formula (I) features in total one, two, three, four or five hydroxy groups.

The compounds of the formula (I) to be applied in the sense of the invention can, depending on the respective meaning of E, conform to following structural formulae (I-A) or (I-B), wherein R1 and R2 have the respective meaning above specified:

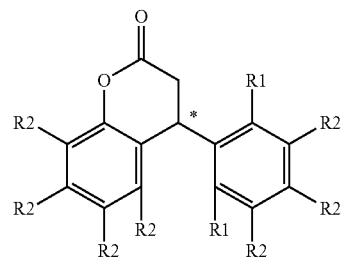

(I-A)

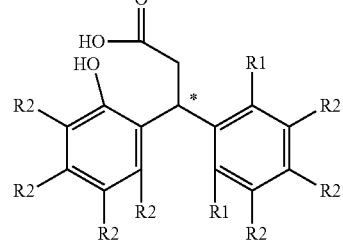

(I-B)

Depending on the pH-value, the lactone ring of the compound of the formula (I-A) can be opened and the compound of the formula (I-A) can be on hand in equilibrium with the corresponding "open chained" compound of the formula (I-B), as schematically shown in the following, wherein $M^+$ means a (preferentially physiologically acceptable) counter cation (and wherein the counter cation preferentially has the subsequently specified meaning):

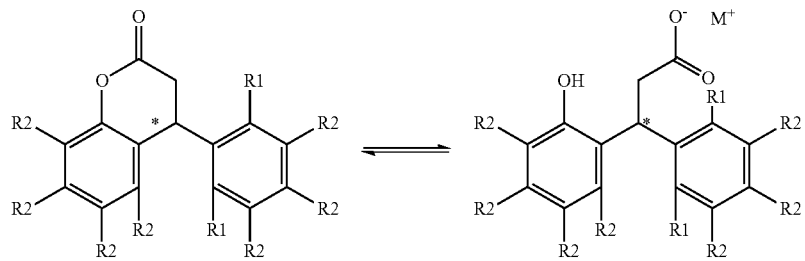

For the case, that at least one of the two rests R1 in formula (I) means a hydroxy group, an equilibrium between the substances with the formula (I-A1) and (I-A2) can be observed mostly depending on the (foodstuff) matrix and its pH-value—in particular in media or matrices with weakly acidic pH-value.

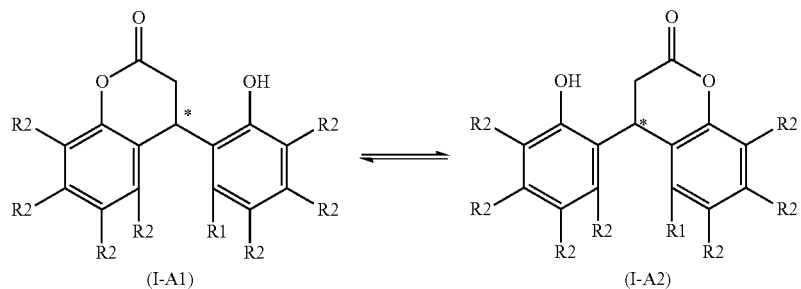

A further aspect of the present invention concerns the use of a substance mixture comprising one or several compounds of the formula (I-A1) and one or several compounds of the formula (I-A2), and/or their physiologically acceptable salts.

Compounds to be applied preferably in the sense of the invention of the formula (I-A1) are the substances (1), (2), (3) and (4)

(1) (4S)-5,7-Dihydroxy-4-(2-hydroxyphenyl)chroman-2-on
(2) (4R)-5,7-Dihydroxy-4-(2-hydroxyphenyl)chroman-2-on
(3) (4S)-5,7-Dimethoxy-4-(4-methoxyphenyl)chroman-2-on
(4) (4R)-5,7-Dimethoxy-4-(4-methoxyphenyl)chroman-2-on

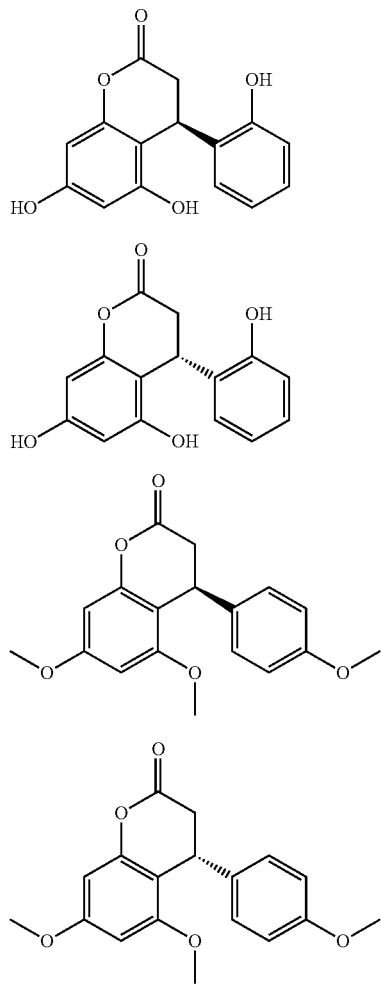

or a salt of a compound of the formulae (1)-(4) or a mixture of the compounds of the formulae (1) to (4), two different salts of compounds of the formulae (1) to (4) or a compound of the formula (1) to (4) and a salt of compounds of the formula (1) to (4) as taste improver, preferably for masking or reduction of unpleasant taste impressions, in particular of bitter, adstringent and/or metallic taste impressions.

For the formation of isomeric compounds depending on the foodstuff matrix and the pH-value, the above said applies.

Preferentially applied in the sense of the sense of the invention are compounds of the formula (I), which are each selected from the group consisting of the compounds of the formula (II)

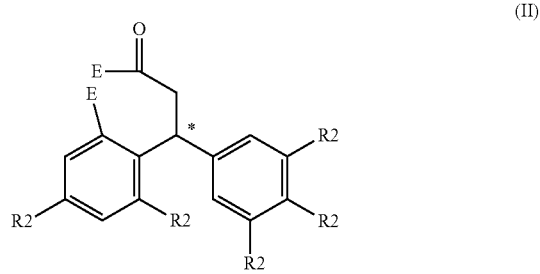

wherein
E mean each OH or both E combined oxygen,
R2 means independent of the other rests R2 hydrogen, hydroxy, methoxy, ethoxy, n-propoxy, iso-propoxy, preferentially H, OH, OCH$_3$ or OCH$_2$CH$_3$, wherein optionally two directly adjacent rests R2 together represent one OCH$_2$O group,
wherein preferentially one or several of the rests R2 mean a hydroxy group, and their physiologically accepted salt.

Further preferred is the use of compounds of the formula (II-A),

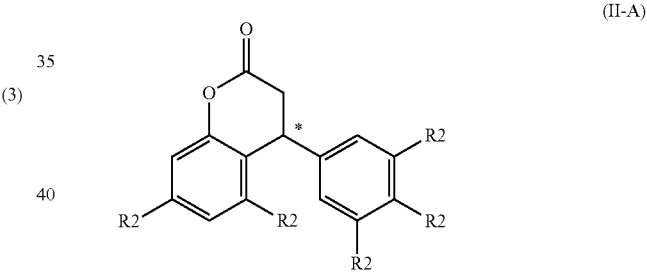

or of a salt of a compound of the formula (II-A) or of a mixture of two or several different compounds of the formula (II-A), two or several different salts of compounds of the formula (II-A) or one or several different compounds of the formula (II-A) and of one or several different salts of one or several different compounds of the formula (II-A), wherein R2, independent of the other rests R2 means hydrogen, hydroxy, methoxy, ethoxy, n-propoxy, iso-propoxy, preferentially H, OH, OCH$_3$ or OCH$_2$CH$_3$, wherein optionally two directly adjacent rests R2 together represent one OCH$_2$O group, and wherein preferentially at least one of the rests R2 mean a hydroxy group. The configuration at the chiral carbon atom (i.e. at the position marked by "*" in the above formula images (II) and (II-A)) can thereby be (R) or (S), respectively.

Preferentially, a compound of the formula (II) or rather a compound of the formula (II-A) features in total one, two, three, four or five hydroxy groups, further preferentially in total one, two, three or four hydroxy groups, especially preferred in total one, two, three or four hydroxy groups.

Especially preferred in the sense of the invention is thereby the use of one or several compounds of the formulae (5)-(66) and/or their physiologically acceptable salts (5) (4S)-5,7-Dihydroxy-4-(3-hydroxy-4-methoxy-phenyl)chroman-2-on
(6) (4R)-5,7-Dihydroxy-4-(3-hydroxy-4-methoxy-phenyl)chroman-2-on
(7) (4S)-4-(3-Hydroxy-4-methoxy-phenyl)-5,7-dimethoxy-chroman-2-on
(8) (4R)-4-(3-Hydroxy-4-methoxy-phenyl)-5,7-dimethoxy-chroman-2-on
(9) (4S)-5,7-Dihydroxy-4-(4-hydroxy-3-methoxy-phenyl)chroman-2-on
(10) (4R)-5,7-Dihydroxy-4-(4-hydroxy-3-methoxy-phenyl)chroman-2-on
(11) (4S)-5,7-Dihydroxy-4-(4-hydroxyphenyl)chroman-2-on
(12) (4R)-5,7-Dihydroxy-4-(4-hydroxyphenyl)chroman-2-on
(13) (4S)-7-Hydroxy-4-(4-hydroxyphenyl)-5-methoxy-chroman-2-on
(14) (4R)-7-Hydroxy-4-(4-hydroxyphenyl)-5-methoxy-chroman-2-on
(15) (4S)-7-Hydroxy-4-(4-hydroxyphenyl)-5-ethoxy-chroman-2-on
(16) (4R)-7-Hydroxy-4-(4-hydroxyphenyl)-5-ethoxy-chroman-2-on
(17) (4S)-7-Hydroxy-4-(4-hydroxyphenyl)-5-propoxy-chroman-2-on
(18) (4R)-7-Hydroxy-4-(4-hydroxyphenyl)-5-propoxy-chroman-2-on
(19) (4S)-4-(4-Hydroxyphenyl)-5,7-dimethoxy-chroman-2-on
(20) (4R)-4-(4-Hydroxyphenyl)-5,7-dimethoxy-chroman-2-on
(21) (4S)-5,7-Dihydroxy-4-(4-methoxyphenyl)chroman-2-on
(22) (4R)-5,7-Dihydroxy-4-(4-methoxyphenyl)chroman-2-on
(23) (4S)-4-(1,3-Benzodioxol-5-yl)-5,7-dihydroxy-chroman-2-on
(24) (4R)-4-(1,3-Benzodioxol-5-yl)-5,7-dihydroxy-chroman-2-on
(25) (4S)-4-(3,4-Dimethoxyphenyl)-5,7-dihydroxy-chroman-2-on
(26) (4R)-4-(3,4-Dimethoxyphenyl)-5,7-dihydroxy-chroman-2-on
(27) (4S)-4-(3,4-Dihydroxyphenyl)-5,7-dihydroxy-chroman-2-on
(28) (4R)-4-(3,4-Dihydroxyphenyl)-5,7-dihydroxy-chroman-2-on
(29) (4S)-7-Hydroxy-4-(4-hydroxyphenyl)chroman-2-on
(30) (4R)-7-Hydroxy-4-(4-hydroxyphenyl)chroman-2-on
(31) (4S)-4-(4-Hydroxyphenyl)-7-methoxy-chroman-2-on
(32) (4R)-4-(4-Hydroxyphenyl)-7-methoxy-chroman-2-on
(33) (4S)-7-Ethoxy-4-(4-hydroxyphenyl)chroman-2-on
(34) (4R)-7-Ethoxy-4-(4-hydroxyphenyl)chroman-2-on
(35) (4S)-4-(4-Hydroxyphenyl)-7-propoxy-chroman-2-on
(36) (4R)-4-(4-Hydroxyphenyl)-7-propoxy-chroman-2-on
(37) (4S)-7-Methoxy-4-(4-methoxyphenyl)chroman-2-on
(38) (4R)-7-Methoxy-4-(4-methoxyphenyl)chroman-2-on
(39) (4S)-5-Hydroxy-4-(4-hydroxy-3-methoxy-phenyl)-7-methoxy-chroman-2-on
(40) (4R)-5-Hydroxy-4-(4-hydroxy-3-methoxy-phenyl)-7-methoxy-chroman-2-on
(41) (4S)-7-Hydroxy-4-(4-hydroxy-3-methoxy-phenyl)-5-methoxy-chroman-2-on
(42) (4R)-7-Hydroxy-4-(4-hydroxy-3-methoxy-phenyl)-5-methoxy-chroman-2-on
(43) (4S)-7-Hydroxy-4-(4-hydroxy-3-ethoxy-phenyl)-5-methoxy-chroman-2-on
(44) (4R)-7-Hydroxy-4-(4-hydroxy-3-ethoxy-phenyl)-5-methoxy-chroman-2-on
(45) (4S)-7-Hydroxy-4-(4-hydroxy-3-propoxy-phenyl)-5-methoxy-chroman-2-on
(46) (4R)-7-Hydroxy-4-(4-hydroxy-3-propoxy-phenyl)-5-methoxy-chroman-2-on
(47) (4S)-4-(4-Hydroxy-3-methoxy-phenyl)-5,7-dimethoxy-chroman-2-on
(48) (4R)-4-(4-Hydroxy-3-methoxy-phenyl)-5,7-dimethoxy-chroman-2-on
(49) (4S)-7-Hydroxy-4-(4-hydroxy-3-methoxy-phenyl)chroman-2-on
(50) (4R)-7-Hydroxy-4-(4-hydroxy-3-methoxy-phenyl)chroman-2-on
(51) (4S)-4-(4-Hydroxy-3-methoxy-phenyl)-7-methoxy-chroman-2-on
(52) (4R)-4-(4-Hydroxy-3-methoxy-phenyl)-7-methoxy-chroman-2-on
(53) (4S)-7-Ethoxy-4-(4-hydroxy-3-methoxy-phenyl)chroman-2-on
(54) (4R)-7-Ethoxy-4-(4-hydroxy-3-methoxy-phenyl)chroman-2-on
(55) (4S)-4-(4-Hydroxy-3-methoxy-phenyl)-7-propoxy-chroman-2-on
(56) (4R)-4-(4-Hydroxy-3-methoxy-phenyl)-7-propoxy-chroman-2-on
(57) (4S)-7-Hydroxy-4-(3-hydroxy-4-methoxy-phenyl)chroman-2-on
(58) (4R)-7-Hydroxy-4-(3-hydroxy-4-methoxy-phenyl)chroman-2-on
(59) (4S)-4-(3-Hydroxy-4-methoxy-phenyl)-7-methoxy-chroman-2-on
(60) (4R)-4-(3-Hydroxy-4-methoxy-phenyl)-7-methoxy-chroman-2-on
(61) (4S)-4-(3,4-Di hydroxyphenyl)-7-hydroxy-chroman-2-on
(62) (4R)-4-(3,4-Di hydroxyphenyl)-7-hydroxy-chroman-2-on The structural formulae of the compounds (5) to (62) to be applied preferentially in the sense of the invention are given in the following for clarification:

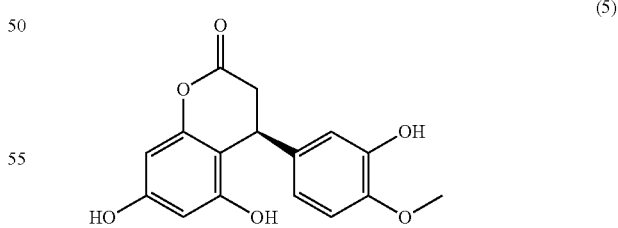

(5)

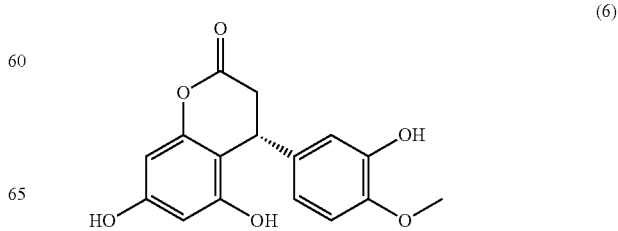

(6)

(7)
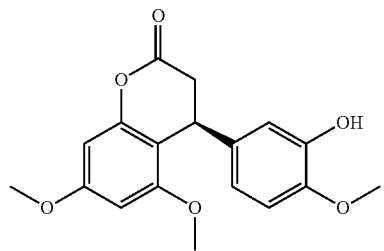
(8)
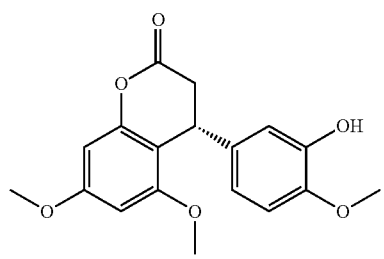
(9)
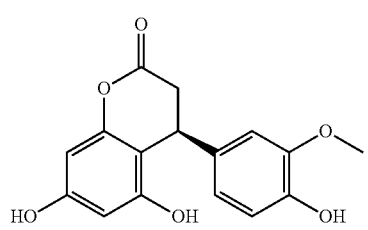
(10)
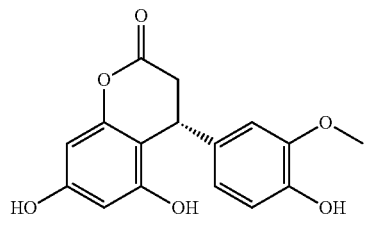
(11)
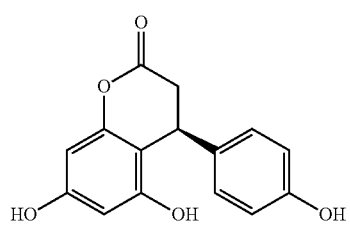
(12)
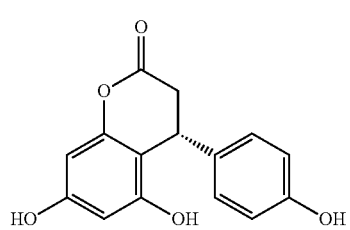
(13)
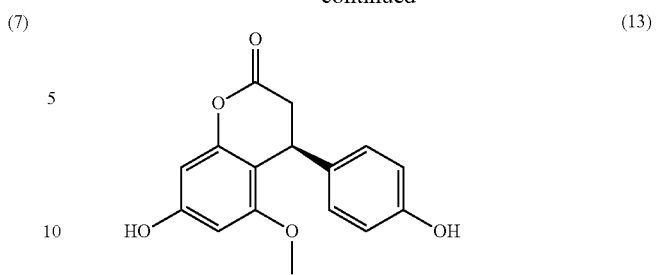
(14)
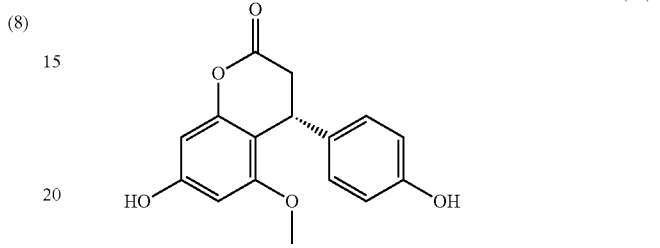
(15)
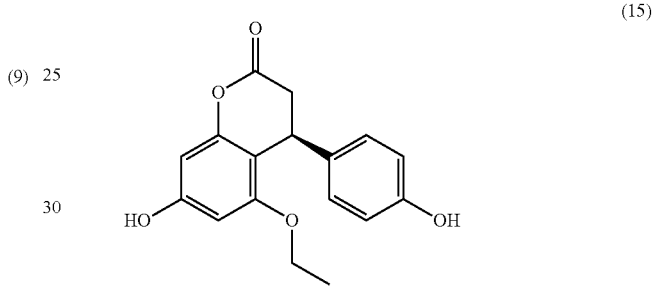
(16)
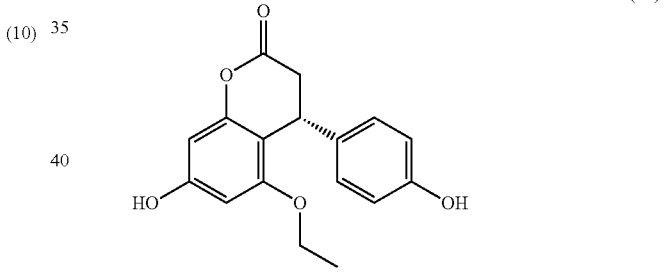
(17)
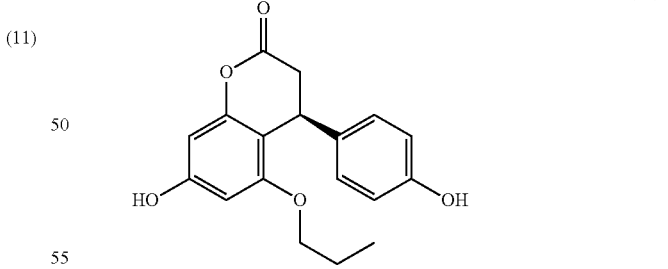
(18)
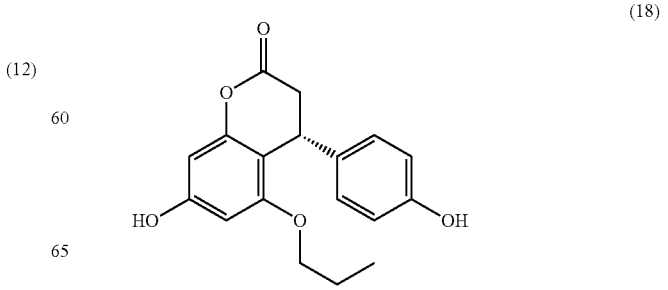

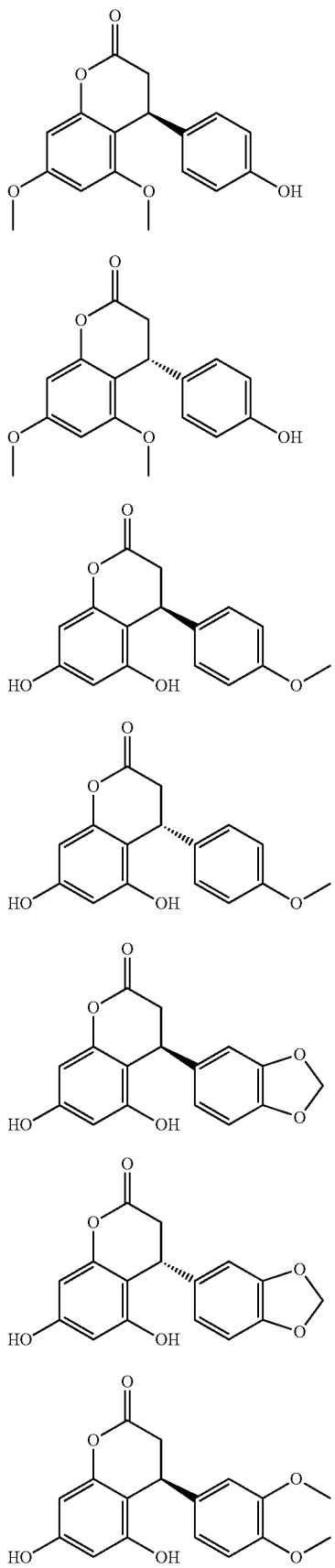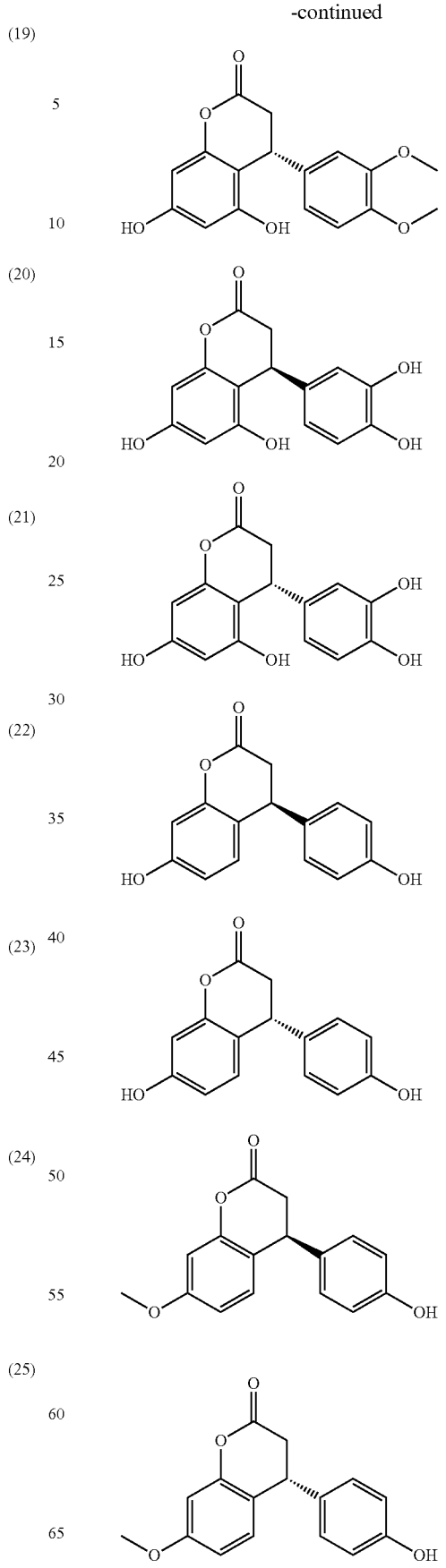

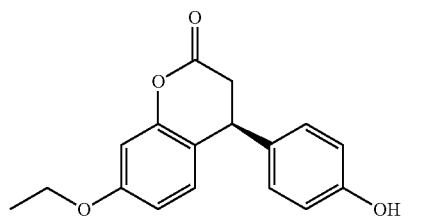
(33)
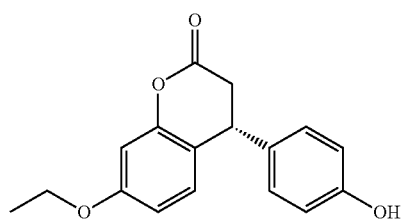
(34)
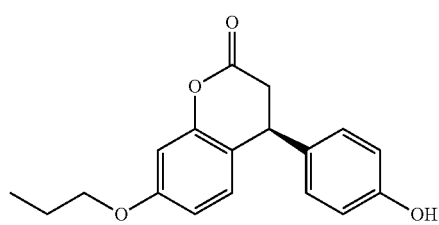
(35)
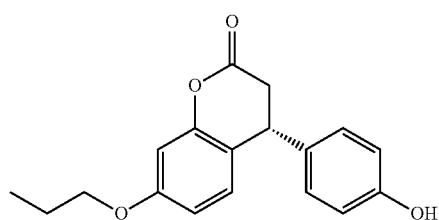
(36)
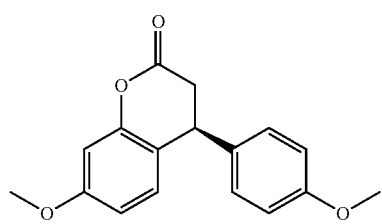
(37)
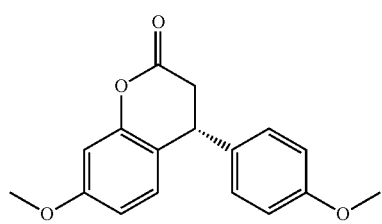
(38)
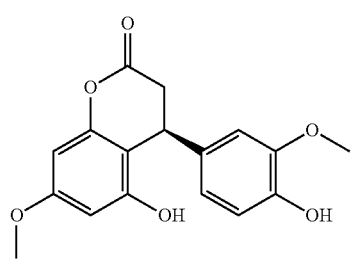
(39)
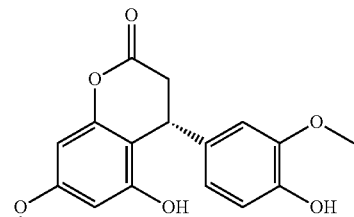
(40)
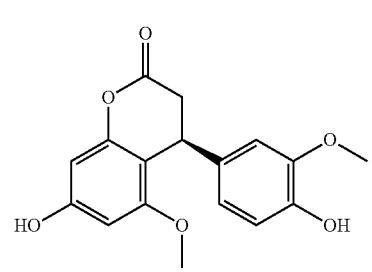
(41)
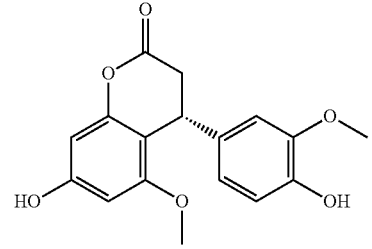
(42)
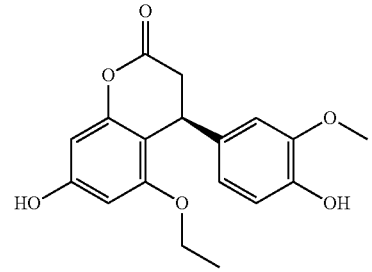
(43)
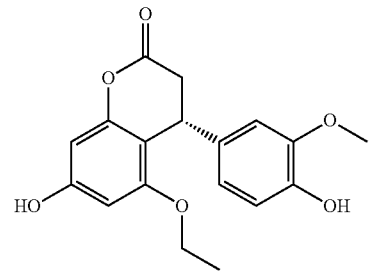
(44)
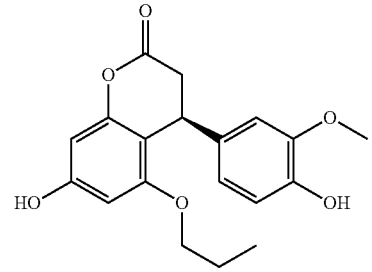
(45)

(46) 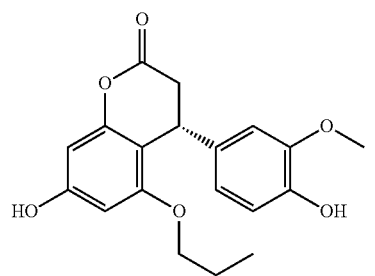
(47) 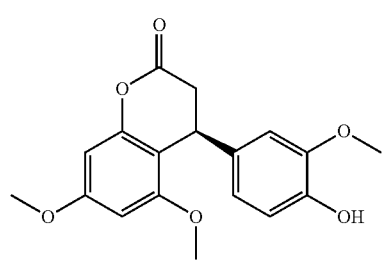
(48) 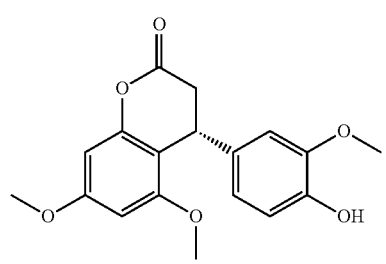
(49) 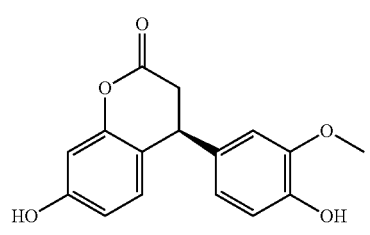
(50) 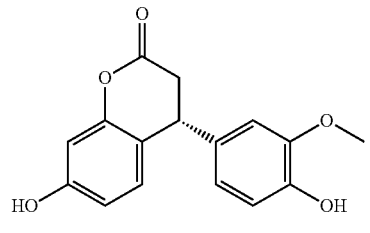
(51) 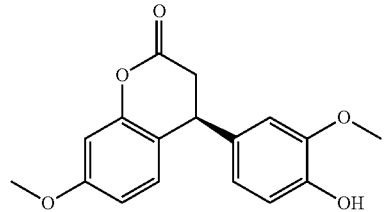
(52) 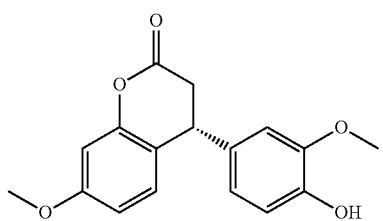
(53) 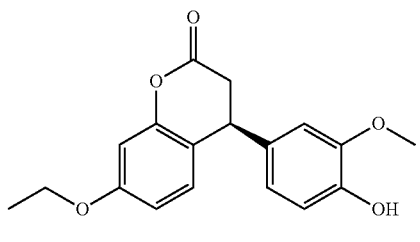
(54) 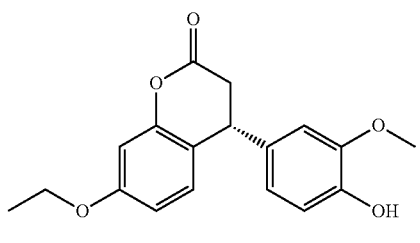
(55) 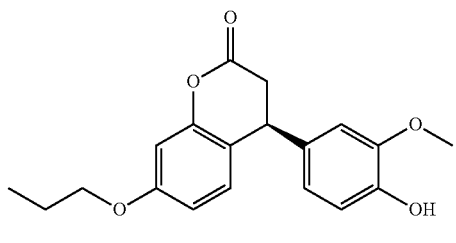
(56) 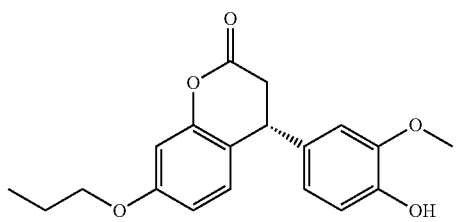
(57) 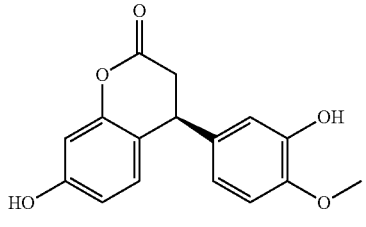
(58) 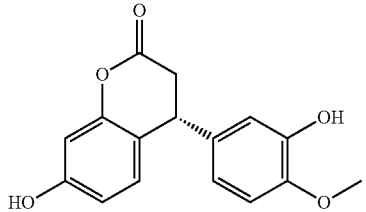

-continued

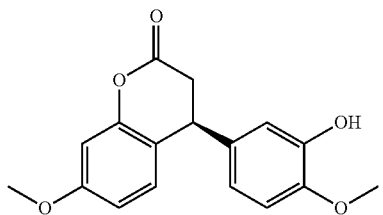
(59)

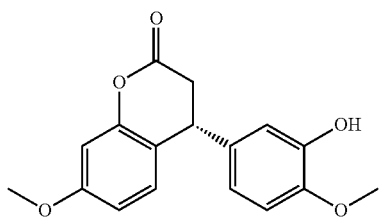
(60)

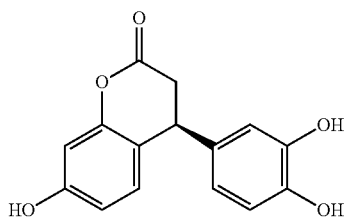
(61)

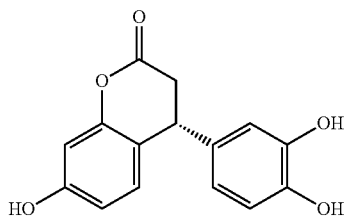
(62)

Different neoflavonoids of the formula (I) can also be found in certain plants or parts of plants.

Especially preferred are here the neoflavonoid compounds (9), (10), (11), (12), (13), (14), (21), (22), (29), (30), (41) and (42) as well as the neoflavonoids (63), (64), (65), and (66) equally coming under the general formula (I), which have been found in Polygonum Perfoliatum (see Planta Medica 1999, 65, 671-673; Chin. J. Appl. Environ. Biol. 2009, 15, 615-620) as well as its physiologically acceptable salts.

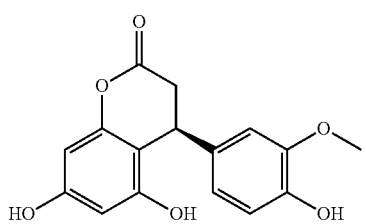
(9)

-continued

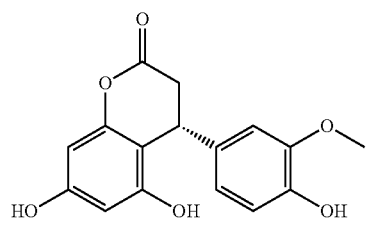
(10)

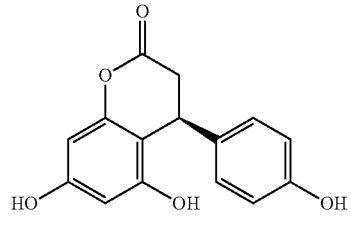
(11)

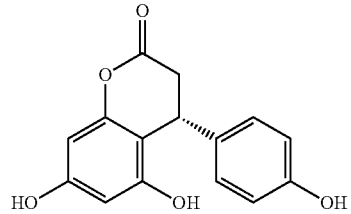
(12)

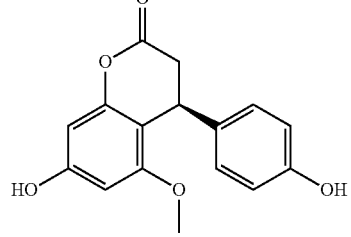
(13)

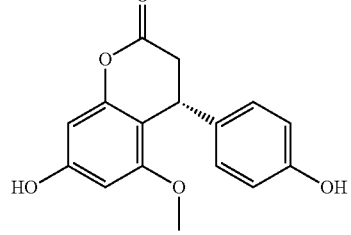
(14)

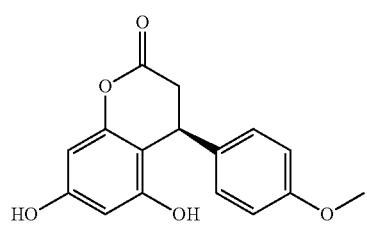
(21)

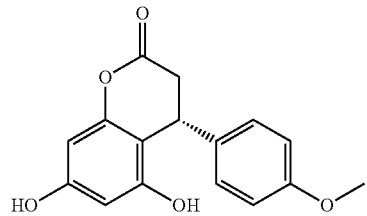
(22)

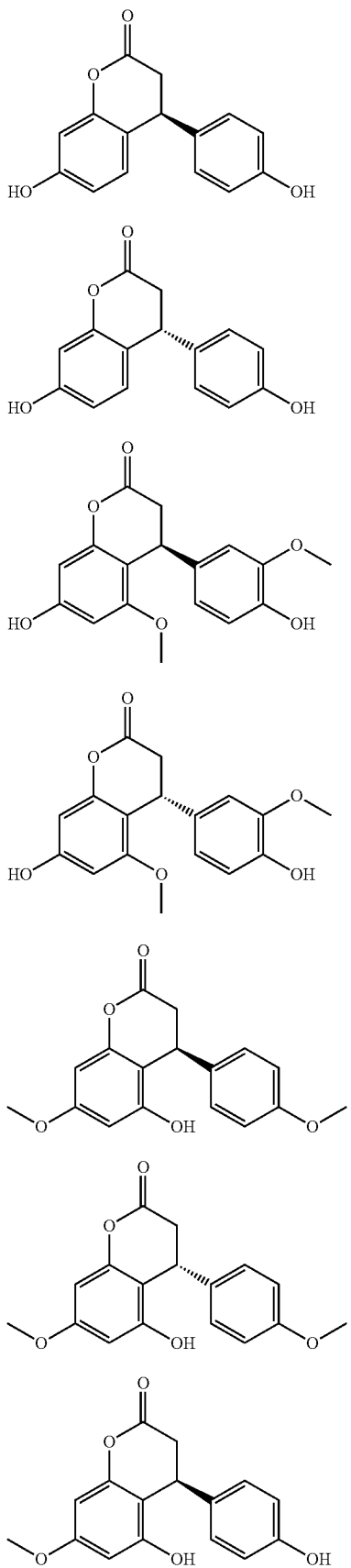

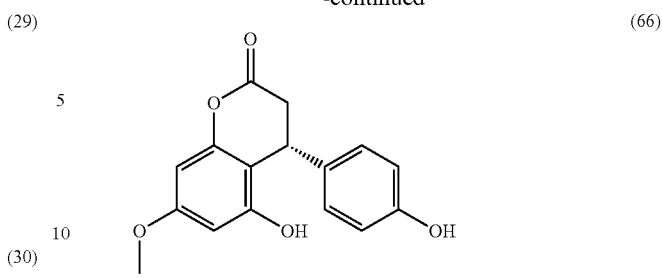

Comprised by the preferred embodiment is further also a salt of one of these compounds, of a mixture of the compounds, of two different salts of these compounds of the formulae as well as one of these compounds and a salt of these compounds.

Accordingly, one or several of the neoflavonoids of the formula (I) to be used in the sense of the invention can be also be used in the sense of the invention in the form of vegetable extracts, particularly in the form of vegetable extracts from Polygonum Perfoliatum.

In the case, that in individual cases there shall be in existence a contradiction between the previously given chemical nomenclature and the respectively depicted structural formula of the compounds of the formulae (1) to (66) to be used preferentially in the sense of the invention, the structural formula is valid.

The neoflavonoids of the formula (I) and/or (II) can be available especially in the form of its cationic salt, such as sodium salts, potassium salts, or ammonium salts.

It is sufficient for a compensation of the sour and/or bitter taste if the neoflavonoids of the formula (Ia) and/or (Ib) are present, added or specifically produced in amounts of about 5 to about 1000 ppm and particularly of about 30 to about 250 ppm and particularly preferably of about 50 to about 100 ppm related to compound (a).

Flavouring Agents

Optionally, the food products can contain further flavoring agents or flavor preparations as component (c). These can be selected from substances for altering or masking of an unpleasant taste impression and/or for enhancing of a pleasant taste impression. Taste correctants are preferably selected from the following group: hesperetin as described in EP 2,368,442 B1 or EP 1,909,599-B1, hydroxybenzoic acid amides as e.g. 2,4-dihydroxybenzoic acid vanillylamide (particularly such as described in WO 2006/024587), 4-hydroxydihydrochalcones (preferably as described in US 2008/0 227867 A1 and WO 2007/107596), here particularly phloretin and davidigenin, hesperetin as disclosed in WO 2007/014879, or extracts from rubus suavissimus as described in U.S. provisional application 61/333,435 (Symrise) and the patent applications based thereon, 3,7'-dihydroxy-4'-methoxyflavan isomers as described in EP 2,253,226, phyllodulcin isomers or extracts containing phyllodulcinas described in EP 2,298,084 B1, 1-(2,4-dihydroxy-phenyl)-3-(3-hydroxy-4-methoxy-phenyl)-propane-1-one as described in EP 2,353,403 B1, neoisoflavonoides as described in EP 2,570,036 B1, pellitorin and derived flavor preparations as described in EP 2,008,530 A1, vanillyllignanes, particularly as described in EP 2,517,574, neoisoflavonoides as described in EP 2,570,035-B1, neohesperidin dhydrochalkone, hesperetin dihydrochalkone, hesperidin dihydrochalkone, naringin dihydrochalkone, phloridzin, trilobatin, steviosides and/or rebaudiosides, particularly various mixtures of different rebaudiosides as described in WO 2015,062,998, rubusosides as described in EP 2,386,211, mixtures of rubusoside-isomers und-homologues, mogrosides, abrusosides and/or balansine as described in WO 2012,164,062.

Further flavoring agents or flavor preparations can be selected from the list of volatile flavoring agents, e.g. acetaldehyde, acetophenone, alpha-cadinol, alpha-copaene, alpha-cubebene, alpha-humulene, alpha-pinene, alpha-terpinene, alpha-terpineol, anisaldehyde, benzaldehyde, benzophenone, beta-copaene, beta-cubebene, beta-cyclocitrale, beta-elemene, beta-Ionone, beta-myrcene, beta-ocimene, beta-pinene, butanol, butyl acetate, camphene, caryophyllene, cis-4-decenal, cis-4-heptenal, cis-3-hexenal, cis-3-hexenol, cis-8-tetradecenal, citral, citronellol, citronellal, citronellyl acetate, cubenol, decanal, decanol, decyl acetate, (e,e)-2,4-decadienal, delta-3-carene, delta-cadinol, delta-carenee, dihydronootkatone, di methylanthranilate, dodecanal, dodecanol, dodecenal, elemol, ethoxyethyl acetate, ethyl-2-hexanol, ethyl-2-methyl butyrate, ethyl-3-hydroxy hexanoate, ethyl-3-hydroxy octanoate, ethyl acetate, ethyl butyrate, ethyl caprinate, ethyl capronate, ethyl caprylate, ethyl crotonate, ethyl propionate, eucalyptol, eugenol, fenchol, gama-eudesmol, gamma-butyrolactone, gamma-terpinene, geranial, geraniol, geranyl acetate, heptanal, heptanol, heptyl acetate, hexanal, hexanol, hexyl acetate, iso-amyl alcohol, isobutanol, isocascarilla acid, iso-piperitenol, isopulegol, limonene, linalool, 12-methyltridecanal, menthadienol, menthadiene, methyl-3-hexanoate, methyl-3-hydroxyoctanoate, methylbutyrate, methylcapronate, methylcaprylate, methyldihydrojasmonate, methylsalicylate, (e,e)-2,4-nonadienal, neral, nerol, neryl acetate, nonanal, nonanol, nootkatene, nootkatol, nootkatone, octanal, octanol, octyl acetate, pentanol, perillaaldehyde, phenylethanol, piperitenone, rotundone, sinensal, terpioiene, trans-2-ethylhexenoate, trans-2-heptenal, trans-2-hexenal, trans-2-hexenal, trans-2-nonenal, trans-2-octenal, trans-2-pentenal, 2-undecenal, undecanal, valencen, I-penten-3-on in form of arbitrary stereoisomers, enantiomers, positional isomers, diastereomers, cis/trans isomers or epimers of these substances.

Flavouring Preparations

A further embodiment of the invention relates to flavor preparations, comprising
(a) at least one neoflavonoid of formula (I) and/or (II)
(b) at least one further flavoring agent.

The proportion of the neoflavonoids in these preparations can be 0.1 to 99.9 wt.-%, preferably about 0.5 to about 25 wt.-% and particularly about 1 to about 10 wt.-%. As further flavoring agents, the substances listed above come into question. The flavoring agents can be encapsulated and/or adsorbed and/or emulsified or can be added to the preparation in such a form.

Capsules

The neoflavonoids forming group (b) as well as flavor preparations which may contain these substances can be present in encapsulated form and be added as capsules to the food products. Capsules are meant to be understood as spherical aggregates, containing at least one solid or liquid core, which is coated by at least one continuous membrane. The fragrances can be encapsulated with coating materials and thus be present as macrocapsules with a diameter of about 0.1 to about 5 mm or as microcapsules with a diameter of about 0.0001 to about 0.1 mm.

Coating Materials

Suitable coating materials are for example starches, including their metabolites as well as chemically or physically produced derivatives (particularly dextrines and maltodextrines), gelatin, gum arabicum, agar-agar, ghatti gum, gellan gum, modified and non-modified celluloses, pullulan, curdlan, carrageenanes, alginic acid, alginates, pectin, inulin, xanthan gum and mixtures of two or more of these substances.

The solid coating material is preferably a gelatin (particularly swine, bovine, poultry and/or fish gelatin), preferably having a sulfur factor of higher than or equal to 20, preferably higher than or equal to 24. Among these substances, gelatin is particularly preferred, as it is well available and can be obtained with different swelling factors.

Preferred as well are maltodextrines (particularly on a grain base, especially corn, wheat, tapioca or potatoes) preferably having de values in the range from 10 to 20. Further preferred are celluloses (e.g. cellulose ether), alginates (e.g. sodium alginate), carrageenan (e.g. beta-, jota-, lambda-, and/or kappa-carrageenan, gum arabicum, curdlan and/or agar-agar.

Additionally, preferred are alginate capsules as they are extensively described e.g. in the following documents EP 0389700 A1, U.S. Pat. Nos. 4,251,195, 6,214,376, WO 2003 055587 or WO 2004 050069 A1.

In a further preferred embodiment, the membrane of the capsules consists of melamin-formaldehyde resins or coacervation products of cationic monomers or biopolymers (as e.g. chitosan) and anionic monomers, such as (meth) acrylates or alginates.

Methods for Encapsulation

The capsules are in general finely disperse, liquid or solid phases coated by film-forming polymers, at the production of which the polymers precipitate after emulsification and coacervation or surface polymerization on the material to be coated. According to another method, molten waxes are incorporated into a matrix ("micro sponge"), which can, as micro particles, be additionally coated with film-forming polymers. According to a third method, particles are alternately coated with polyelectrolytes of different charge ("layer-by-layer" method). The microscopically small capsules can be dried as powder. In addition to mononuclear microcapsules, also polynuclear aggregates, also called microspheres, are known, which contain two or more cores distributed in the continuous membrane material. Mono- or polynuclear microcapsules can additionally be coated by a further second, third, etc. Membrane. This membrane can consist of natural, semisynthetic or synthetic materials. Natural membrane materials are e.g. gum arabicum, agar-agar, agarose, maltodextrines, alginic acid and the salts thereof, e.g. sodium or calcium alginate, fats and fatty acids, cetylalcohols, collagen, chitosan, lecithins, gelatin, albumin, shellac, polysaccharides such as starch or dextran, polypeptides, protein hydrolysates, sucrose and waxes. Semisynthetic membrane materials are among others chemically modified celluloses, particularly cellulose ester and ether, e.g. cellulose acetate, ethyl cellulose, hydroxypropyl cellulose, hydroxypropylmethyl cellulose and carboxymethyl cellulose, as well as starch derivatives, particularly starch ethers and esters. Synthetic membrane materials are e.g. polymers as polyacrylates, polyamides, polyvinyl alcohols or polyvinylpyrrolidone.

Examples for microcapsules in the state of the art are the following commercial products (the respective membrane material is given in brackets): Hallcrest Microcapsules (gelatin, gum arabicum), Coletica Thalaspheres (maritime collagen), Lipotec Millicapsules (alginic acid, agar-agar), Induchem Unispheres (lactose, microcrystalline cellulose, hydroxypropylmethyl cellulose); Unicerin C30 (lactose, microcrystalline cellulose, Hydroxypropylmethyl cellulose), Kobo Glycospheres (modified starch, fatty acid ester, phospholipids), Softspheres (modified agar-agar) and Kuhs Probiol Nanospheres (phospholipids) as well as Primaspheres and Primasponges (chitosan, alginates) and Primasys (phospholipids).

Chitosan microcapsules and methods for their production are well known in the state of the art [WO 01/01926, WO 01/01927, WO 01/01928, WO 01/01929]. Microcapsules with a mean diameter in the range of 0.0001 to 5, preferably 0.001 to 0.5 and particularly 0.005 to 0.1 mm, consisting of a membrane and a matrix containing the active substances can be obtained by
  (a) preparing a matrix from gelling agents, cationic polymers and active substances,
  (b) optionally dispersing the matrix in an oil phase,
  (c) treating the dispersed matrix with aqueous solutions of anionic polymers and optionally removing the oil phase thereby.

The steps (a) and (c) are variably by replacing the cationic polymers in step (a) with anionic polymers and vice versa.

The capsules can also be produced by coating the active substance alternately with layers of differently charged polyelectrolytes (layer-by-layer technology). In this context it is referred to the European Patent EP 1064088 B1 (Max-Planck Gesellschaft).

INDUSTRIAL APPLICATION

A further aspect of the invention relates to a method for reducing the sour and/or bitter taste of citrus fruit products, comprising the following steps:
  (i) Providing a citrus fruit product, the sour and/or bitter taste of which shall be improved and
  (ii) Adding or specifically producing an amount, which is improving the taste, of at least one neoflavonoid of the formula (I) and/or (II), preferably of from about 5 to about 1000 ppm and particularly from about 30 to about 250 ppm—related to the citrus component.

Instead of the neoflavonoids, of course a flavoring mixture comprising these can be used.

Additionally claimed is the use of neoflavonoids of the formula (I) and/or (II) or rather flavor preparations comprising these for the improvement of the sour and/or bitter taste of citrus fruit products, wherein the amount added or the amount specifically produced again is preferably from about 5 to about 1000 ppm and particularly from about 30 to about 250 ppm related to the citrus component.

As far as a preferred selection of components and additives as well as indications of quantities was made above, it also applies for the method according to the invention as well as the use without requiring a repetition thereof.

EXAMPLES

Example 1

Masking the Perception of the Acid and the Bitterness in Orange Juice, which was Obtained from Premature Fruits and/or HLB Infected Fruits with at least 5 ppm Limonin Commercial orange juices were used for the experiments, which according to an analysis contain limonin and are regularly evaluated as too sour, bitter and too little sweet from the panelists. The panelists (n=6-8) thereby evaluate the 3 attributes "sweet", "bitter" and "sour" on an unstructured scale of 0 (no taste) to 10 (strong taste). In one sample, the panelists receive the orange juice alone, in a further sample, they received the orange juice which was supplemented with an amount of neoflavonoids as listed in one of the tables. Thereby, the order is arbitrary and not known to the panelists before.

In the following Tables 1A to 1D, the results of the evaluations are summed up.

TABLE 1A

Evaluation of taste

| Trial 1A | Assessment (0-10) | | |
|---|---|---|---|
| | Bitter | Sour | Sweet |
| Orange juice, oranges infected with HLB from early ripening Hamlin March 2014 | 4.2 | 4.3 | 3.1 |
| Orange juice, oranges infected with HLB from early ripening Hamlin March 2014 and 15 ppm 5,7-dihydroxy-4-(4-hydroxy-3-methoxy-phenyl)chroman-2-on (1:1 mixture from component 9 and 10) | 2.7 | 3.5 | 3.8 |
| Relative change | −36% | −19% | +22% |
| Orange juice comprising 7.8 ppm limonin | 4.7 | 5.5 | 4.0 |
| Orange juice comprising 7.8 ppm limonin und 10 ppm 5,7-dihydroxy-4-(4-hydroxy-3-methoxy-phenyl)chroman-2-on (1:1 mixture from component 9 and 10) | 2.5 | 3.5 | 6.0 |
| Relative change | −46% | −35% | +52% |

TABLE 1B

Evaluation of taste

| Trial 1B | Assessment (0-10) | | |
|---|---|---|---|
| | Bitter | Sour | Sweet |
| Orange juice comprising 7 ppm limonin | 5.1 | 4.7 | 4.3 |
| Orange juice comprising 7 ppm limonin and 20 ppm 5,7-dihydroxy-4-(4-hydroxy phenyl)-chroman-2-on (1:1 mixture from component 11 and 12) | 2.8 | 3.1 | 4.8 |
| Relative change | −45% | −33% | +13% |

TABLE 1C

Evaluation of taste

| Trial 1C | Assessment (0-10) | | |
|---|---|---|---|
| | Bitter | Sour | Sweet |
| Orange juice comprising 7 ppm limonin | 4.8 | 4.3 | 4.1 |
| Orange juice comprising 7 ppm limonin and 25 ppm 7-hydroxy-4-(4-hydroxy-phenyl)-chroman-2-on (1:1 mixture from component 29 and 30)) | 2.4 | 3.0 | 5.3 |
| Relative change | −45% | −33% | +13% |

TABLE 1D

Evaluation of taste

| Trial 1D | Assessment (0-10) | | |
|---|---|---|---|
| | Bitter | Sour | Sweet |
| Orange juice comprising 7 ppm limonin | 4.8 | 4.3 | 4.1 |
| Orange juice comprising 7 ppm limonin and 25 ppm 7-hydroxy-4-(4-hydroxy-3-methoxy-phenyl)-5-methoxy-chroman-2-on (1:1 mixture from component 41 and 42) | 2.7 | 3.7 | 5.9 |
| Relative change | −43% | −13% | +43% |

Example 2

Masking of Typical Bitter Substances from Citrus Products

For quantifying the reduction (i.e. the masking or the decrease) of the bitter impression in a sample, the bitterness of a solution containing the bitter substances named in the following Table 2 in column 1 were each compared with a sample, which contained the corresponding bitter substance and additionally the respectively specified amount of a neoflavonoid (column 2) by a group of experts (classification: 1 [not bitter] to 10 [extremely bitter]). For the analysis, i. e. the calculation of the reduction (in %) of the bitter impression, the respective average values of the assessments of the group of experts were used.

TABLE 2

Evaluation of taste

| Bitter substance | Neoflavonoid | Assessment Bitter (0-10) | | |
|---|---|---|---|---|
| | | Without neoflavonoid | With neoflavonoid | Relative masking |
| 50 ppm poncirin | 5,7-dihydroxy-4-(4-hydroxy-3-methoxy-phenyl)-chroman-2-on (1:1 mixture from component 9 and 10) | 4.9 | 3.5 | −29% (p < 0.05) |
| 50 ppm poncirin | 5,7-dihydroxy-4-(4-hydroxy phenyl)-chroman-2-on (1:1 mixture from component 11 and 12) | 4.0 | 3.6 | −8% |
| 75 ppm naringin | 5,7-dihydroxy-4-(4-hydroxy-3-methoxy-phenyl)-chroman-2-on (1:1 mixture from component 9 and 10) | 3.8 | 2.9 | −24% |
| 75 ppm naringin | 5,7-dihydroxy-4-(4-hydroxy phenyl)-chroman-2-on (1:1 mixture from component 11 and 12) | 4.5 | 3.7 | −18% |
| 100 ppm naringin | 7-hydroxy-4-(4-hydroxy-3-methoxy-phenyl)-5-methoxy-chroman-2-on (1:1 mixture from component 41 and 42) | 4.4 | 3.7 | −15% |
| 10 ppm limonin | 5,7-dihydroxy-4-(4-hydroxy-3-methoxy-phenyl)-chroman-2-on (1:1 mixture from component 9 and 10) | 3.1 | 2.5 | −19% |
| 10 ppm limonin | 5,7-dihydroxy-4-(4-hydroxy phenyl)-chroman-2-on (1:1 mixture from component 11 and 12) | 4.6 | 2.8 | −38% (p < 0.05) |

Example 3

Masking of the Perception of the Acid in Citrus Containing Carbonated Drinks

For quantifying the reduction (i. e. the masking or the decrease) of the perception of the acid in a sample, the panelists (n=6-8) assess the attribute "sour" on a non-structured scale from 0 (no taste)-10 (strong taste). The panelists receive in one sample the citrus-/lime soft drink reduced in sugar alone, in a further sample the soft drink, to which an amount of neoflavonoids specified in Table 3 has been added. Thereby, the order is arbitrary and not known to the panelists before. In the following Table, the results of the evaluations are summed up.

TABLE 3

Evaluation of taste

| Beverage | Neoflavonoid | Assessment Sour (0-10) | | |
|---|---|---|---|---|
| | | Without neoflavonoid | With neoflavonoid | Relative masking |
| Carbonated soft drink (7° Brix, 0.2% citric acid, 0.0001% citrus oil, 0.0001% lime oil, 0.06% citrus aroma) | 7-hydroxy-4-(4-hydroxy-3-methoxy-phenyl)-5-methoxy-chroman-2-on (1:1 mixture from component 41 and 42) | 4.1 | 3.4 | −17% (p < 0.1) |

APPLICATION EXAMPLES

Application Example 1

Orange Juice Drink (Quantities ins wt.-%)

| Ingredients | A | B | C | D | E | F | G |
|---|---|---|---|---|---|---|---|
| Orange juice (7.8 ppm Limonin) | 50 | 50 | 50 | 50 | 50 | 50 | 50 |
| Water | ad 100 | ad 100 | ad 100 | ad 100 | ad 100 | ad 100 | ad 100 |
| Orange headnote | 0.004 | 0.004 | 0.004 | 0.004 | 0.004 | 0.004 | 0.004 |
| Citric acid | — | — | — | — | 0.1 | 0.05 | — |
| *Citrus* extract | — | — | — | — | 0.0005 | 0.0003 | — |
| 1:1- mixture from component 9 and 10 | 0.0015 | 0.001 | 0.0015 | 0.001 | 0.002 | 0.001 | 0.001 |
| Homoeriodictyol-Na | — | 0.001 | — | — | — | 0.001 | 0.001 |
| Phloretin (1%) | — | — | 0.15 | — | — | — | — |
| Naringenin | — | — | 0.0015 | 0.0025 | — | 0.002 | 0.002 |
| Hesperetin | — | — | 0.001 | 0.0015 | — | 0.0005 | — |

Application Example 2

Pectin Stuffing (Quantities ins wt.-%)

| Ingredients | A | B | C | D | E | F | G |
|---|---|---|---|---|---|---|---|
| Sucrose | 55 | 55 | 55 | 55 | 55 | 55 | 55 |
| Glucose syrup, DE 40 | 35 | 35 | 35 | 35 | 35 | 35 | 35 |
| Water | 40 | 40 | 40 | 40 | 40 | 40 | 40 |
| Pectin (GenuPectin D100 buff.) | 2.6 | 2.6 | 2.6 | 2.6 | 2.6 | 2.6 | 2.6 |
| Sodium citrate | 0.2 | 0.2 | 0.2 | 0.2 | 0.2 | 0.2 | 0.2 |
| Lactic/acidic acid mixture | 2 | 2 | 2 | 2 | 2 | 2 | 2 |
| Orange juice concentrate | 2.5 | 2.5 | 2.5 | 2.5 | 2.5 | 2.5 | 2.5 |
| *Citrus* aroma | 0.20 | 0.20 | 0.20 | 0.20 | 0.20 | 0.2 | 0.2 |
| 1:1-mixture from component 9 and 10 | 0.0025 | 0.001 | — | — | 0.0015 | 0.0005 | 0.001 |
| 1:1-mixture from component 11 and 12 | — | — | 0.0015 | 0.001 | — | 0.0015 | 0.001 |
| Naringenin | — | 0.001 | — | 0.0015 | — | — | 0.002 |
| Hesperetin | — | — | 0.001 | — | — | 0.001 | — |
| Homoeriodictyol-Na | — | — | — | — | 0.003 | 0.003 | 0.002 |

The dry substances are dissolved in water and boiled with the pectin and sodium citrate for about 3-5 minutes at 106° C. up to a Brix-value of 77-78°. Subsequently, the orange juice concentrate and the flavors are admixed. After slight cooling down, the mass is quickly filled into forms and cooled.

Application Example 3

Orange Sorbet (Quantities ins wt.-%)

| Ingredient | A | B | C | D | E |
|---|---|---|---|---|---|
| Orange juice concentrate (5, 5x, 60Bx) | 6 | 6 | 6 | 6 | 6 |
| Sucrose | 21 | 21 | 21 | 21 | 21 |
| Glucose syrup 72% TS | 11 | 11 | 11 | 11 | 11 |
| Emulsifier/stabilizer | 0.5 | 0.5 | 0.5 | 0.5 | 0.5 |
| Citric acid (50) | 0.6 | 0.6 | 0.6 | 0.6 | 0.6 |
| Orange aroma | 0.1 | 0.1 | 0.1 | 0.1 | 0.1 |
| 1:1-mixture from component 9 und 10 | 0.0025 | 0.001 | — | — | 0.001 |
| 1:1-mixture from component 11 und 12 | — | — | 0.0015 | 0.0015 | 0.001 |
| Naringenin | — | 0.0025 | 0.0015 | — | — |
| Eriodictyol | — | — | — | — | 0.001 |
| Hesperetin | — | 0.0010 | — | — | 0.001 |
| Homoeriodictyol-Na | — | — | 0.0010 | — | 0.003 |
| Water | Fill to 100% | | | | |

The emulsifier and stabilizer is mixed with sugar and dissolved in water; Glucose syrup is added and dissolved. Subsequently, the mixture is pasteurized and allowed to cool down. Into the mixture, the aroma components and the fruit juice concentrate is added, the pH value is adjusted to 3.8-4.2 with 50% citric acid solution and the composition is let to be frozen out in an ice machine with 40-80% overrun.

Application Example 4

Cordial (Quantities ins wt.-%)

| Ingredient | A | B | C | D | E |
|---|---|---|---|---|---|
| Water | 55 | 55 | 55 | 55 | 55 |
| Alcohol 96.5% | 28 | 28 | 28 | 28 | 28 |
| Sucrose | 14 | 14 | 14 | 14 | 14 |

-continued

| Ingredient | A | B | C | D | E |
|---|---|---|---|---|---|
| Caramel sugar syrup 50% Water | 2 | 2 | 2 | 2 | 2 |
| Jagdbitter extract 50% Vol | 0.8 | 0.5 | 0.5 | | |
| *Citrus* peel extract 50% Vol | | | | 0.8 | 0.5 |
| Orange oil bitter | 0.005 | 0.01 | 0.01 | | 0.002 |
| Grapefruit oil 0.1% alc. | 0.05 | 0.1 | 0.1 | | |
| Herb aroma headnote | | | | 0.004 | 0.004 |
| Vanillin | 0.0002 | 0.0002 | 0.0002 | 0.0002 | 0.0002 |
| 1:1-mixture from component 9 and 10 | 0.0025 | 0.001 | — | — | 0.001 |
| 1:1-mixture from component 11 and 12 | — | — | 0.0015 | 0.0015 | 0.001 |
| Naringenin | — | 0.003 | 0.002 | — | 0.0015 |
| Homoeriodictyol-Na | — | — | 0.002 | — | 0.0015 |
| Water | | | Fill to 100% | | |

Dissolve sugar with water. Add and dissolve further ingredients. Pasteurize and cool down.

Application Example 5

Mixed Beer Beverage with Grapefruit (Quantities ins wt.-%)

| Ingredient | A | B | C | D | E |
|---|---|---|---|---|---|
| Beer type wheat beer 5% Vol | 49 | 49 | 49 | 49 | 49 |
| Carbonate water 6 g/L $CO_2$ | 45 | 45 | 45 | 45 | 45 |
| Sucrose | 4 | 4 | 4 | 4 | 4 |
| Citric acid monohydrate | 0.05 | 0.05 | 0.05 | 0.05 | 0.05 |
| Grapefruit juice concentrate 55 Brix | 0.5 | 0.5 | 0.5 | 0.5 | 0.5 |
| Orange juice concentrate 65 Brix | 0.1 | 0.1 | 0.1 | 0.1 | 0.1 |
| Carminic acid E120 8.2% | 0.015 | 0.015 | 0.015 | 0.015 | 0.015 |
| Vitamin C E300 | 0.011 | 0.011 | 0.011 | 0.011 | 0.011 |
| Potassium sorbate 20% | 0.06 | 0.06 | 0.06 | 0.06 | 0.06 |
| Guar gum | 0.03 | 0.03 | 0.03 | 0.03 | |
| Locust bean gum | | | 0.03 | 0.03 | 0.03 |
| Grapefruit aroma | 0.06 | 0.06 | 0.06 | 0.06 | 0.06 |
| 1:1-mixture from component 9 and 10 | 0.0025 | 0.001 | — | — | 0.001 |
| 1:1-mixture from component 11 and 12 | — | — | 0.0015 | 0.0015 | 0.001 |
| Naringenin | — | 0.003 | 0.002 | — | 0.0015 |
| Homoeriodictyol-Na | — | — | 0.002 | — | 0.0015 |
| Water | | | Fill to 100% | | |

Dissolve beer base with sugar and water. Add and dissolve further ingredients. Pasteurize and cool down.

Application Example 6

Orange Jelly (Quantities ins wt.-%)

| Ingredient | A | B | C | D | E |
|---|---|---|---|---|---|
| Oranges, peeled and puréed | 45 | 46 | 70 | 48 | 70 |
| Bitter oranges, peeled and puréed | 5 | 4 | 5 | 2 | 5 |
| Zests from peel of bitter oranges | — | 0.5 | 0.5 | 0.25 | 0.5 |
| Apple pectin | 0.75 | 1.0 | 1.5 | 0.75 | 1.5 |
| Calcium citrate | 0.15 | 0.2 | 0.3 | 0.2 | 0.3 |

-continued

| Ingredient | A | B | C | D | E |
|---|---|---|---|---|---|
| Sucrose | ad 100 | — | — | ad 100 | ad 100 |
| Fruit sugar | — | ad 100 | — | — | — |
| Fructose glucose-syrup | — | — | ad 100 | — | — |
| 1:1-mixture from component 29 and 30 | 0.003 | 0.004 | 0.003 | 0.0015 | 0.003 |
| 1:1-mixture from component 21 and 22 | — | — | — | 0.0015 | 0.003 |

Application Example 7

Iced Tea with Orange Juice (Quantities ins wt.-%)

| Ingredient | A | B | C | D | E |
|---|---|---|---|---|---|
| Orange juice concentrate (5, 5x, 60Bx) | 1 | 1 | 1 | 1 | 1 |
| Sucrose | 5 | 5 | 5 | 5 | 5 |
| Black tea extract | 0.12 | 0.12 | 0.12 | 0.12 | 0.12 |
| Emulsifier/stabilizer | 0.5 | 0.5 | 0.5 | 0.5 | 0.5 |
| Citric acid | 0.3 | 0.3 | 0.3 | 0.3 | 0.3 |
| Ice tea aroma | 0.05 | 0.05 | 0.05 | 0.05 | 0.05 |
| 1:1-mixture from component 9 and 10 | 0.002 | — | — | — | 0.0005 |
| 1:1-mixture from component 11 and 12 | — | 0.002 | — | — | 0.0005 |
| 1:1-mixture from component 13 and 14 | — | — | 0.002 | — | 0.0005 |
| 1:1-mixture from component 41 and 42 | — | — | — | 0.002 | 0.0005 |
| Water | | | Fill to 100% | | |

The invention claimed is:
1. A food product comprising:
(a) juice of HLB-infected oranges having both a sour taste and a bitter taste, wherein the juice comprises:
at least 3 ppm of limonin,
at least 5 ppm of polymethoxylated flavanones, and
at least 200 ppm of hesperidin,
(b) about 5 ppm to about 1,000 ppm of an enantiomeric mixture of neoflavonoids selected from:
(i) (9) (4S)-5,7-Dihydroxy-4-(4-hydroxy-3-methoxyphenyl)chroman-2-on and
(10) (4R)-5,7-Dihydroxy-4-(4-hydroxy-3-methoxyphenyl)chroman-2-on;
(ii) (11) (4S)-5,7-Dihydroxy-4-(4-hydroxyphenyl)chroman-2-on and (12) (4R)-5,7-Dihydroxy-4-(4-hydroxyphenyl)chroman-2-on;
(iii) (29) (4S)-7-Hydroxy-4-(4-hydroxyphenyl)chroman-2-on and (30) (4R)-7-Hydroxy-4-(4-hydroxyphenyl)chroman-2-on;
(iv) (41) (4S)-7-Hydroxy-4-(4-hydroxy-3-methoxyphenyl)-5-methoxy-chroman-2-on and
(42) (4R)-7-Hydroxy-4-(4-hydroxy-3-methoxyphenyl)-5-methoxy-chroman-2-on;
salts thereof, or mixtures thereof

(9)

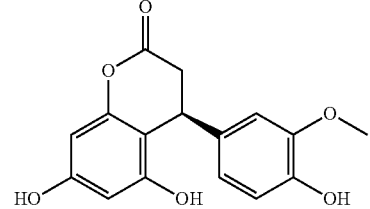

(10)
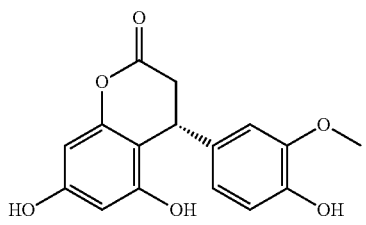

(11)
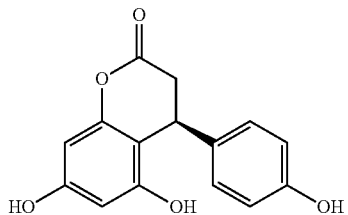

(12)
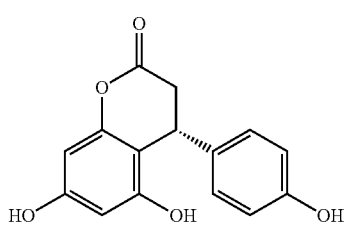

(29)
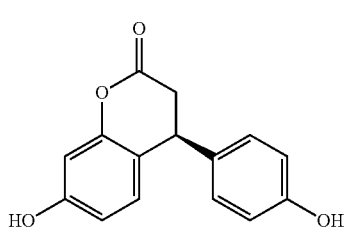

(30)
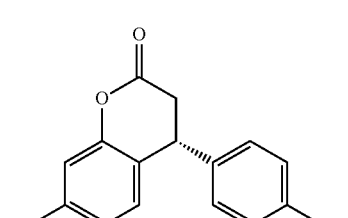

(41)
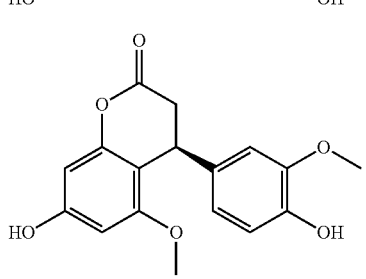

(42)
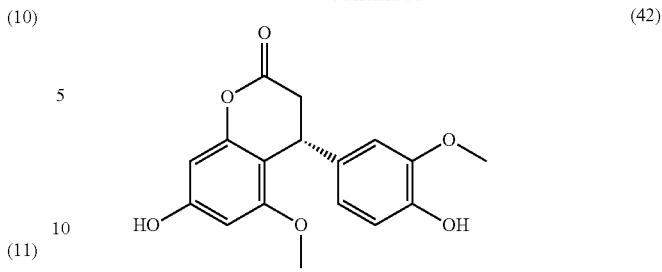

wherein the (S)-enantiomer and the (R)-enantiomer of the enantiomeric mixture of neoflavonoids are in a ratio of 1:1, the limonin and the enantiomeric mixture are in a ratio of 1:1.3 to 1:3.6;

the mixture of neoflavonoids of (b) is in an amount that reduces the sour taste, reduces the bitter taste, and increases sweetness of the juice of the HLB-infected oranges of (a), and the food product has a reduced sour taste, a reduced bitter taste, and increased sweetness compared to a comparative food product without the mixture of neoflavonoids of (b) but otherwise identical to the food product.

2. The food product of claim 1, wherein the mixture of neoflavonoids of (b) is in an amount of about 5 to about 250 ppm.

3. The food product of claim 1, wherein the mixture of neoflavonoids of (b) is in an amount of about 5 to about 100 ppm.

4. The food product of claim 1, wherein the mixture of neoflavonoids of (b) is in an amount of about 5 ppm to about 25 ppm.

5. The food product of claim 3, wherein the juice of HLB-infected oranges of (a) comprises at least 5 ppm of limonin.

6. The food product of claim 1, wherein the food product further comprises hesperetin.

7. The food product of claim 1, wherein the juice of HLB-infected oranges of (a) does not include juice from peels of the HLB-infected oranges.

8. The food product of claim 1, wherein the enantiomeric mixture is:

ii) (3) (4S)-5,7-dimethoxy-4-(4-methoxyphenyl)chroman-2-on and (4) (4R)-5,7-dimethoxy-4-(4-methoxyphenyl)chroman-2-on.

* * * * *